(12) United States Patent
Brielmair et al.

(10) Patent No.: US 11,216,019 B2
(45) Date of Patent: Jan. 4, 2022

(54) THERMOSTAT FOR A TRANSMISSION OIL CIRCUIT AND TRANSMISSION OIL CIRCUIT

(71) Applicant: Bayerische Motoren Werke Aktiengesellschaft, Munich (DE)

(72) Inventors: Martin Brielmair, Fraunberg (DE); Stefan Ruhstorfer, Gmund am Tegernsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 16/363,200

(22) Filed: Mar. 25, 2019

(65) Prior Publication Data

US 2019/0219148 A1 Jul. 18, 2019

Related U.S. Application Data

(63) Continuation of application No. PCT/EP2017/077045, filed on Oct. 24, 2017.

(30) Foreign Application Priority Data

Nov. 3, 2016 (DE) ..................... 10 2016 221 601.5

(51) Int. Cl.
*G05D 23/02* (2006.01)
*F16H 57/04* (2010.01)

(52) U.S. Cl.
CPC ....... *G05D 23/022* (2013.01); *F16H 57/0412* (2013.01); *F16H 57/0413* (2013.01); *G05D 23/025* (2013.01)

(58) Field of Classification Search
CPC ... F16H 7/0413; G05D 23/025; G05D 23/022
See application file for complete search history.

(56) References Cited

U.S. PATENT DOCUMENTS

| 9,732,644 B2 * | 8/2017 | Kim .................. G05D 23/022 |
| 2006/0108435 A1 * | 5/2006 | Kozdras .................. F28F 27/02 236/93 R |
| 2007/0164123 A1 * | 7/2007 | Willers ............... F16H 57/0413 236/93 R |
| 2008/0256943 A1 | 10/2008 | Shimizu et al. |

(Continued)

FOREIGN PATENT DOCUMENTS

| CN | 101611246 A | 12/2009 |
| CN | 103635670 A | 3/2014 |

(Continued)

OTHER PUBLICATIONS

International Search Report (PCT/ISA/210) issued in PCT Application No. PCT/EP2017/077045 dated Jan. 5, 2018 with English translation (five (5) pages).

(Continued)

*Primary Examiner* — Devon Russell
(74) *Attorney, Agent, or Firm* — Crowell & Moring LLP

(57) ABSTRACT

A thermostat for a transmission oil circuit has a thermostat inlet, a thermostat outlet, and a bypass channel, which fluidically connects the thermostat inlet to the thermostat outlet. A circuit inlet and a circuit outlet are provided for coupling to a cooler. A control element and a pressure loss element are accommodated in the interior of the thermostat housing. The pressure loss element is arranged in the bypass channel, and the control element is arranged between the thermostat inlet and the circuit inlet or the circuit outlet and the thermostat outlet. The thermostat can be connected directly to a housing of the transmission.

12 Claims, 4 Drawing Sheets

(56) References Cited

U.S. PATENT DOCUMENTS

| | | | | |
|---|---|---|---|---|
| 2009/0025922 A1* | 1/2009 | Strzelczyk | ............ | G05D 23/022 |
| | | | | 165/297 |
| 2012/0247582 A1* | 10/2012 | Lamb | .................... | F16K 11/044 |
| | | | | 137/468 |
| 2015/0185738 A1* | 7/2015 | Qiu | .................... | G05D 23/1333 |
| | | | | 236/101 A |
| 2016/0047459 A1* | 2/2016 | Wen | ...................... | F16K 31/002 |
| | | | | 137/468 |
| 2016/0103456 A1* | 4/2016 | Cho | .................... | G05D 23/025 |
| | | | | 236/101 R |
| 2016/0224037 A1* | 8/2016 | Qiu | ........................ | F01M 5/007 |

FOREIGN PATENT DOCUMENTS

| | | |
|---|---|---|
| DE | 10 2004 021 551 A1 | 2/2006 |
| DE | 10 2013 021 090 A1 | 6/2015 |

OTHER PUBLICATIONS

German-language Written Opinion (PCT/ISA/237) issued in PCT Application No. PCT/EP2017/077045 dated Jan. 5, 2018 (five (5) pages).

German-language Search Report issued in counterpart German Application No. 10 2016 221 601.5 dated Aug. 15, 2017 with partial English translation (11 pages).

Chinese-language Office Action issued in Chinese Application No. 201780051932.0 dated May 21, 2020 with English translation (17 pages).

* cited by examiner

THERMOSTAT FOR A TRANSMISSION OIL CIRCUIT AND TRANSMISSION OIL CIRCUIT

CROSS REFERENCE TO RELATED APPLICATIONS

This application is a continuation of PCT International Application No. PCT/EP2017/077045, filed Oct. 24, 2017, which claims priority under 35 U.S.C. § 119 from German Patent Application No. 10 2016 221 601.5, filed Nov. 3, 2016, the entire disclosures of which are herein expressly incorporated by reference.

BACKGROUND AND SUMMARY OF THE INVENTION

The invention relates to a thermostat for a transmission oil circuit, and to a transmission oil circuit, in particular of a vehicle transmission.

Thermostats of this type have a thermostat inlet, a thermostat outlet, a bypass channel which connects the thermostat inlet fluidically to the thermostat outlet, and a circuit inlet which is connected fluidically to the thermostat inlet, and finally a circuit outlet which is connected fluidically to the thermostat outlet.

In the case of vehicle transmissions, in particular automatic transmissions, it is necessary to cool the transmission oil, for example by way of a transmission oil/air cooler or a transmission oil/water heat exchanger. In the case of the use of a transmission oil/water heat exchanger, no change in the flow path in the transmission oil circuit is necessary, since the thermal outflow from the transmission oil circuit and the temperature of the transmission oil are set and regulated by way of the cooling water quantity which flows through the heat exchanger. Furthermore, the pressure loss in the transition oil circuit is determined via the viscosity change in a manner which is dependent on the temperature. In contrast to this, if a transmission oil/air cooler is used, it is necessary for regulating the setting of the oil temperature to change the oil circuit, in particular to switch in a bypass function during warming up, and to bridge the heat sink as a result. As a result, in the case of the transmission oil/air cooling, the pressure loss in the oil circuit scales not only via the viscosity, but also by way of the switching state of the transmission oil circuit. In order to use the two different systems in the vehicle, namely a transmission oil/air cooler and a transmission oil/water heat exchanger, it would therefore be necessary to use two different vehicle transmissions which have different control units. This is expensive. Rather, it is more appropriate for it to be possible for the one or other cooling system to be used optionally in the same transmission, which has not been possible up to now, in particular on account of the pressures which are to be maintained subsequently at different temperatures.

For example, approximately 2500 mbar have to be achieved at 1.5 l/min and a temperature of the transmission oil of $-15°$ C., just as at most 1400 mbar have to be achieved at 11 l/min and 70° C. transmission oil temperature. In addition, there is also a switching point at 76° C., at which switching point, in the case of a transmission oil/air cooler, the bypass is switched on or off. Here, an expansion element is used which switches between two channels within the thermostat. Said switching point of the expansion element lies at 76° C. If the transmission oil has to be cooled, the thermostat activates the cooler, with the result that transmission oil is cooled via the cooler. Conversely, for the case where the transmission oil is too cold, the thermostat is switched in such a way that the bypass channel is flowed through, but the cooler is not flowed through. In this way, however, it becomes more complicated to fulfill the above-mentioned design or pressure loss points. In addition, in a thermostat of this type, the flows in the bypass case are what are known as gap flows, since the abovementioned expansion element is usually used in the thermostat as a valve which opens or closes a narrow flow gap in the case of a heat change. The pressure losses of gap flows scale very differently, however, with the volumetric flow and the oil viscosity, and cannot be detected, for example, by way of simulations on a tube line. The scalings which occur are unfavorable for maintaining the abovementioned design or pressure loss points. A further difficulty results by virtue of the fact that, depending on the vehicle variant, the thermostat is seated at a different position in the vehicle. This in turn leads to the pressure losses varying greatly with the opening of the bypass channel. This can be compensated for only by different thermostat variants being developed which have different pressure losses in the bypass channel.

It is an object of the invention to improve a thermostat for a transmission oil circuit, in particular a transmission oil circuit with a connected transmission oil/air cooler, in such a way that said thermostat is of simple construction and can be used more universally. In addition, a transmission oil circuit is to be provided, in the case of which the setting of the pressure losses is more easily possible. Finally, the thermostat is to make it possible to cause no adaptations in the connected transmission, with the result that the latter can also be coupled without redesigning to a transmission oil/air cooler.

The invention is achieved by way of a thermostat for a transmission oil circuit, in particular of a vehicle transmission, having a thermostat inlet, a thermostat outlet, a bypass channel which connects the thermostat inlet fluidically to the thermostat outlet, a circuit inlet which is connected fluidically to the thermostat inlet, a circuit outlet which is connected fluidically to the thermostat outlet, a control outlet and a pressure loss member. The pressure loss member is arranged in the bypass channel in a manner which is spaced apart from the control element. The throughflow cross section through the bypass channel is independent of the switching position of the control element, that is to say the pressure loss member is not part of the valve which is defined by way of the control element.

It is possible by way of the solution according to the invention to achieve complete decoupling of the pressure losses which are produced when the bypass channel is switched on and when the cooling circuit is switched on. It is possible by way of the pressure loss member in the bypass channel to set the pressure loss precisely which occurs when the bypass channel is switched on. In this way, a suitable characteristic of the pressure loss scaling in relation to viscosity and volumetric flow is always made possible. Furthermore, the gap flow which is difficult to manage or set in the bypass can be replaced by a tube flow, by a suitable pressure loss member being connected in between. In contrast to the orifice flow, a tube flow has a pronounced longitudinal extent, of at least 2 mm in the present case. In the case of orifice flows, the pressure loss scales mainly via the geometry, whereas the increasingly dominant influence of the viscosity is utilized in the case of a tube flow. The invention manages to set the ratio of the two effects (viscosity influence and geometry influence) in an optimum manner.

The control element is configured, in particular, in such a way that it can control the volumetric flow of the oil through the circuit inlet and/or the circuit outlet in a manner which is dependent on the oil temperature.

In particular, the control element is an expansion element, as had also been used up to this point, with the result that no more novel constructions are required here.

A spring on the control element ensures a restoring function for the closure member in the switching direction. The spring should surround the expansion element on the outer side, for example.

The pressure loss member is preferably configured as a separate body, that is to say separately from the housing. In this way, adaptations can be achieved without great redesigns via the exchangeability of the pressure loss member.

The pressure loss member has, for example, a body which protrudes into the bypass channel and constricts it in sections. Therefore, no oil has to flow through the pressure loss member; rather, the flow channel in this section is defined firstly by way of the bypass channel and secondly by way of the outer side of the pressure loss member. In this way, the pressure loss member can be of very simple design.

One variant which has proven advantageous in tests consists in that an annular gap results between the pressure loss member (or the body) and the wall of the bypass channel, in which annular gap a tube flow is configured. The annular gap ensures a large wetted surface area, which increases the viscosity influence.

The rapid exchangeability and adaptability of the thermostat according to the invention is achieved, in particular, by way of an exchangeable pressure loss member.

The body of the pressure loss member can also be fastened in a sprung manner to the housing of the thermostat; in particular, a carrier of the pressure loss member can be coupled to the body via the spring. Via said spring, for example, the axial position of the pressure loss member in the bypass can also be set in a simple way, by the body being pressed against a stop via the spring.

The prestress of the pressure loss member by way of the spring can also be utilized for further functions. As a result, for example, a pressure relief valve can be realized, via which, in the case of a bypass which is actually not switched, the bypass is de-restricted after a predefined pressure is achieved in the transmission oil circuit.

If the pressure loss member (or the body) has a helical or threaded worm-shaped design, a spiral channel can result between the body and the inner side of the bypass channel. As an alternative to this, the pressure loss member has numerous thin channels which are arranged next to one another.

A further option which has proven to be very expedient in tests consists in configuring the pressure loss member with a bundle of tube lines which run next to one another, what is known as a tube bundle. Said tube bundle can either be made in the housing of the thermostat (for example, can be formed during injection molding of the housing), or a separate insert can be used, in which the tube lines are configured.

It would also be possible in the case of the annular gap to configure the latter without a separate insert directly in the housing of the thermostat. It would be necessary here, however, to connect the "core" in the center of the ring via webs to the outer wall of the annular gap.

The thermostat has a housing, the thermostat inlet and the thermostat outlet being provided on a side of the housing, the circuit inlet and the circuit outlet being present on the end side of the housing, and an assembly opening for exchanging the pressure loss member being provided on an upper side or lower side of the housing. This design ensures a very compact and easy to produce construction of the housing and the channels which are provided therein and can be drilled from different sides, usually in a clamping means.

The pressure loss member can be configured as a single-piece section of the housing, which single-piece section constricts the bypass channel in sections and divides it into two sections which are connected to one another by way of a plurality of channels in the pressure loss member.

As an alternative, as has been described above, the pressure loss member can also be produced by way of injection molding. The production is simplified if the channels which are possibly present in the pressure loss member run in the demolding direction. By virtue of the fact that the assembly opening is accessible from a different side than the thermostat inlet/outlet and the circuit inlet/outlet, even an exchange in the assembled state of the thermostat is simplified, since the accessibility is improved.

The production capability of the thermostat is simplified further by virtue of the fact that two parallel channels are provided in the interior of the housing of the thermostat, the thermostat inlet opening laterally into one channel and the thermostat outlet emanating laterally from the other channel, with the result that the channels are divided in each case into two sections, of which in each case one is assigned to the bypass channel and one is assigned to the circuit. This means that the channels can be produced, for example, by way of linear bores, with the result that complicated casting molds are unnecessary. The abovementioned object is also achieved by way of a transmission oil circuit having a transmission and a thermostat, in particular in accordance with the invention, the transmission having a transmission oil outlet which merges directly into the thermostat inlet and/or the transmission having a transmission oil inlet which merges directly into the thermostat outlet. Here, the concept consists in that an intermediate channel which has been customary up to now in the form of tube lines is not provided between the thermostat and the transmission. Rather, the thermostat is flange-connected directly to the transmission. Lines of different length which led to different pressure losses between the transmission and the thermostat in the prior art can thus be avoided. As a consequence, the pressure losses can be determined only by way of the bypass channel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
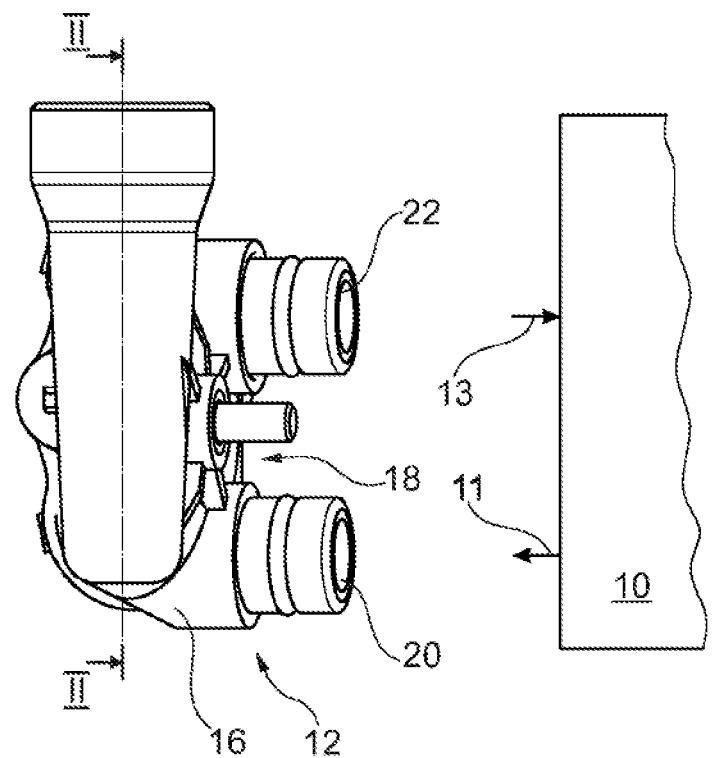
FIG. 1 shows a side view of the transmission oil circuit having a thermostat according to an embodiment of the invention.

FIG. 1 shows a transmission oil circuit of a transmission of a vehicle, in particular having an automatic transmission. The transmission has an outer housing 10, to which a thermostat 12 is connected directly and from which lines lead to a transmission oil/air cooler 14 (see FIG. 2).

The thermostat 12 has a housing 16 with a first side 18, on which a thermostat inlet 20, via which transmission oil flows into the thermostat 12, and a thermostat outlet 22, via which transmission oil flows back into the transmission housing 10, are provided. In the present exemplary embodiment, the thermostat inlet 20 and the thermostat outlet 22 are configured as projecting stubs which are provided with O-ring seals. Said stubs are plugged into corresponding openings in the transmission housing 10. The housing 10 has a transmission oil outlet 11 which is connected directly to the thermostat inlet 20 and merges into it, and a transmission oil inlet 13 which merges directly into the thermostat outlet 22.

Figure 2:
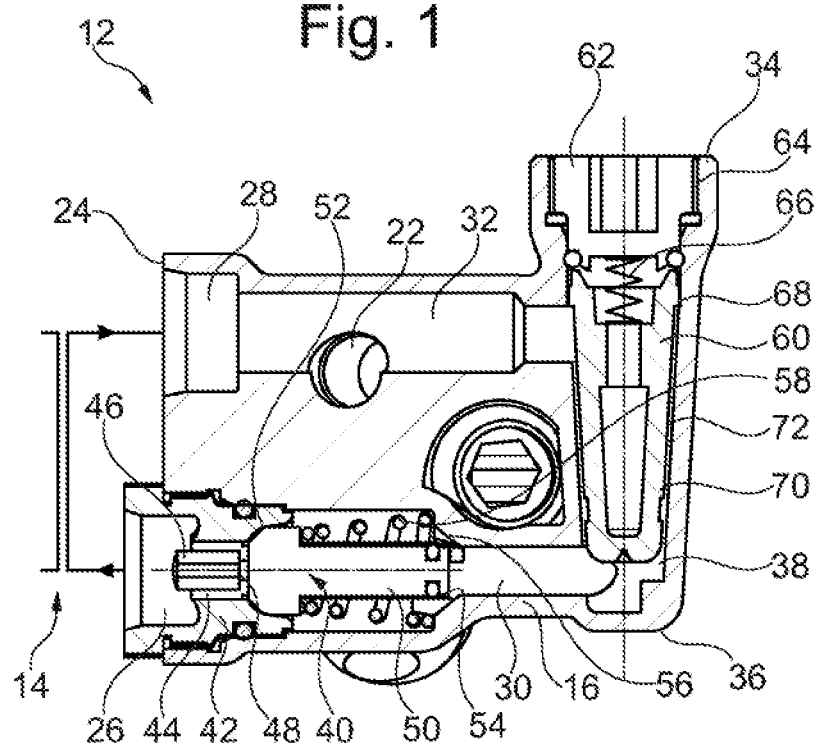
FIG. 2 shows a sectional view along the line II-II through the thermostat in FIG. 1.

A circuit inlet 26 and a circuit outlet 28 are formed (here, for example, as a widened bore for plugging in a corresponding tube line) on an end side 24 which can be seen in FIG. 2.

A plurality of channels are produced in the interior of the housing 16 by way of linear bores and/or during casting of the housing.

A first channel 30 emanates from the end side 24, and a second channel 32 which likewise emanates from the end side runs parallel to the first channel 30. The thermostat inlet 20 (concealed in FIG. 2) opens into the first channel 30, and the thermostat outlet 22 opens into the second channel 32 (see FIG. 2). Therefore, a first section of the channel extends from the opening of the thermostat inlet 20 in the first channel 30 as far as the circuit inlet 26. A first section of the channel 32 likewise extends from the circuit outlet 28 as far as the opening of the thermostat outlet 22.

To the right of the two said first sections of the channels 30, 32, said channels 30, 32 run further, however. In this region, said sections form parts of what is known as a bypass channel which is of U-shaped configuration, the limbs of which are formed by way of the sections of the channels 30, 32, and the center section of which is formed by way of a channel 38 which emanates from an upper side 34 (also possibly from the lower side 36).

Important components for the function of the thermostat are inserted into the channels or channel sections. A control element 40 is inserted in the first channel 30, which control element 40 is received into the seat element 42 which is pressed or screwed into the widened end of the channel 30 and is configured in a similar manner to a sleeve with an intermediate wall. Said seat element 42 has a plurality of passage channels 44 in its center and webs which run in the circumferential direction between said passage channels 44 to the center and support, or merge into, a support 46 which is configured as a counterholder. A tappet 48 of the control element 40 is received in the support 46. The control element 40 is configured as an expansion element which, in its interior, contains an expansion material which widens in the case of a temperature increase and moves the tappet 48 to a greater or lesser extent out of the housing 50 of the control element.

At its two opposite ends, the housing 50 has shut-off faces 52, 54 which can be brought into contact with corresponding valve seats on the seat element 42 or on a shoulder 56 in the channel 30, more precisely in the section which is assigned to the bypass channel.

A spring 58 which surrounds the control element 40 presses the housing 50 in the switching direction toward the seat element 42.

A pressure loss member 60 is inserted via an assembly opening 64 on the upper side 34 into the bypass channel, more precisely in the channel 38. The pressure loss member 60 is a part which is separate from and spaced apart from the control element 50 and is of very simple configuration, in the present case as a cylinder or a slightly conical part. A carrier 62 closes the channel 38 in the region of what is known as the assembly opening 64 which represents the opening of the channel 38. A spring 66 can possibly be provided between the carrier 62 and the pressure loss member 60, which spring 66 presses the pressure loss member 60 against a stop 68 on the housing 60. In this way, the axial position of the pressure loss member 60 in the channel 38 is fixed.

The pressure loss member 60 protrudes into the bypass channel and forms an annular gap 72 between the wall of the bypass channel and what is known as the body 70 of the pressure loss member 60 (the body forms the outer side of the pressure loss member in the region of the bypass), the gap width of which annular gap 72 can be set exactly.

By virtue of the fact that the pressure loss member 60 can be exchanged very simply and rapidly for a pressure loss member of minimum different geometry, the annular gap 72 can be adapted in such a way that, if the bypass is switched on, the pressure loss which is generated by the bypass in the transmission oil circuit can be set exactly.

The pressure loss member 60 can also be configured as a pressure relief valve in the bypass channel. The body 70 is pressed into contact in one direction by way of the spring 66. If a defined positive pressure is reached in the bypass channel, however, the oil presses the body 70 upward counter to the spring 66, with the result that the annular gap and therefore the flow cross section in the bypass channel are increased on account of the conicity. The circuit is de-restricted.

If the transmission oil is still cold, the tappet 48 has again moved to a minimum extent out of the housing 50, with the result that it is not supported on the support 46 in the axial direction. On account of the positioning by way of the spring 58, the surface 52 presses against the valve seat, with the result that no flow of transmission oil to the circuit inlet 26 can take place in this region.

In order to ventilate the transmission during the first engine running, it can be advantageous to provide a small ventilating bore in the housing, which ventilating bore can ventilate the transmission oil circuit without opening of the control element.

Since the housing 50 is pressed to the left, the bypass channel is enabled, however, since a sufficiently large gap is produced between the shoulder 56 and the surface 54. Said gap is considerably larger, for example larger at least by the factor two, than the annular gap 72 in relation to the cross-sectional area, with the result that the pressure loss in the bypass channel is not set by way of said gap, but rather by way of the annular gap 72. Therefore, transmission oil flows via the thermostat inlet 20 into the bypass channel, and there via the annular gap 72 as far as the thermostat outlet 22.

It is to be emphasized that the position of the thermostat inlet 20 and the thermostat outlet 22 can also be swapped. The flow is then in the opposite direction. In the case of the embodiment which is shown, however, the expansion element is flowed onto directly by the warm transmission oil, with the result that it is not influenced by a mixed flow at different temperatures. This solution is therefore more robust in terms of fluid mechanics.

If the transmission oil is hot, the tappet 48 is supported on the support 46 and pushes the housing 50 into the bypass channel to such an extent that it comes into contact with the shoulder 56 and closes the bypass channel, whereas the inflow to the cooling circuit is at the same time open in the region of the surface 52 and transmission oil passes via the channels 44 to the circuit inlet 26.

The embodiment in accordance with FIG. 3 corresponds substantially to that in accordance with FIG. 2, with the result that only the differences have to be addressed in the following text.

Figure 3:
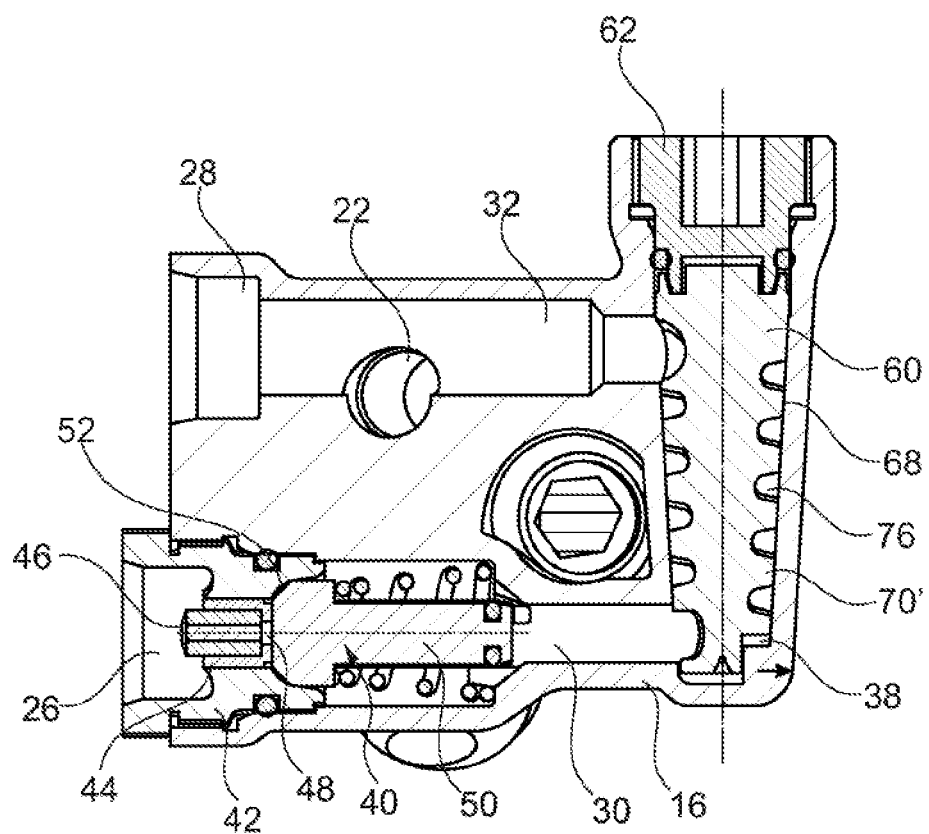
FIG. 3 shows a sectional view through a second variant of the thermostat along the line II-II in FIG. 1.

Whereas the body 70 of the control element 60 in accordance with FIG. 2 was configured as a cylindrical or slightly conical body which defines the annular gap 72, the body 70' according to the embodiment in accordance with FIG. 3 is configured as a body with a helical or spiral channel 76. On the outer side, the channel 76 is closed by way of the inner side of the wall of the bypass channel, that is to say of the housing 16. This therefore results in a spiral channel instead of an annular channel 72. The spring 66 is omitted here, but it can also optionally be present.

Figure 4:
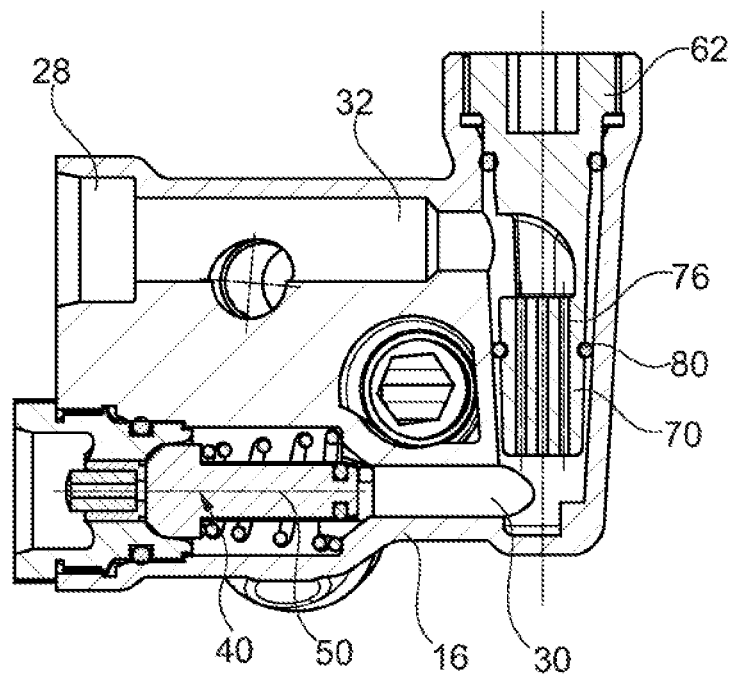
FIG. 4 shows a sectional view through a third variant of the thermostat along the line II-II in FIG. 1.

In the case of the embodiment in accordance with FIG. 4, the pressure loss member 70 which is configured as a separate body has a plurality of thin, long channels 76, the length of which corresponds to a multiple of their diameter, and which channels 76 divide the flow into a large number of part flows.

The pressure loss member 70 is configured in one piece with the carrier 62 and can therefore be removed easily from the outside.

A seal 80 seals the outer circumference of the pressure loss member with respect to the inner side of the channel wall.

Figure 5:
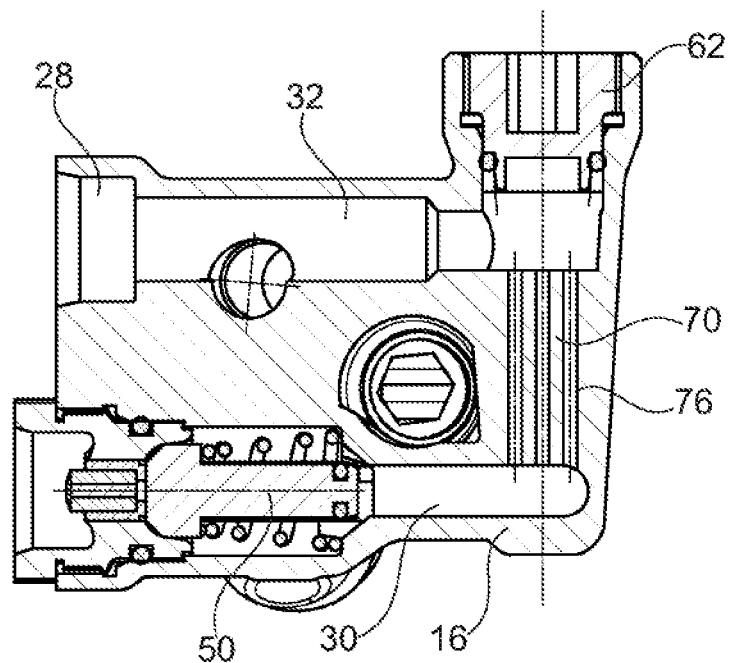
FIG. 5 shows a sectional view through a fourth variant of the thermostat along the line II-II in FIG. 1.
Figure 6:
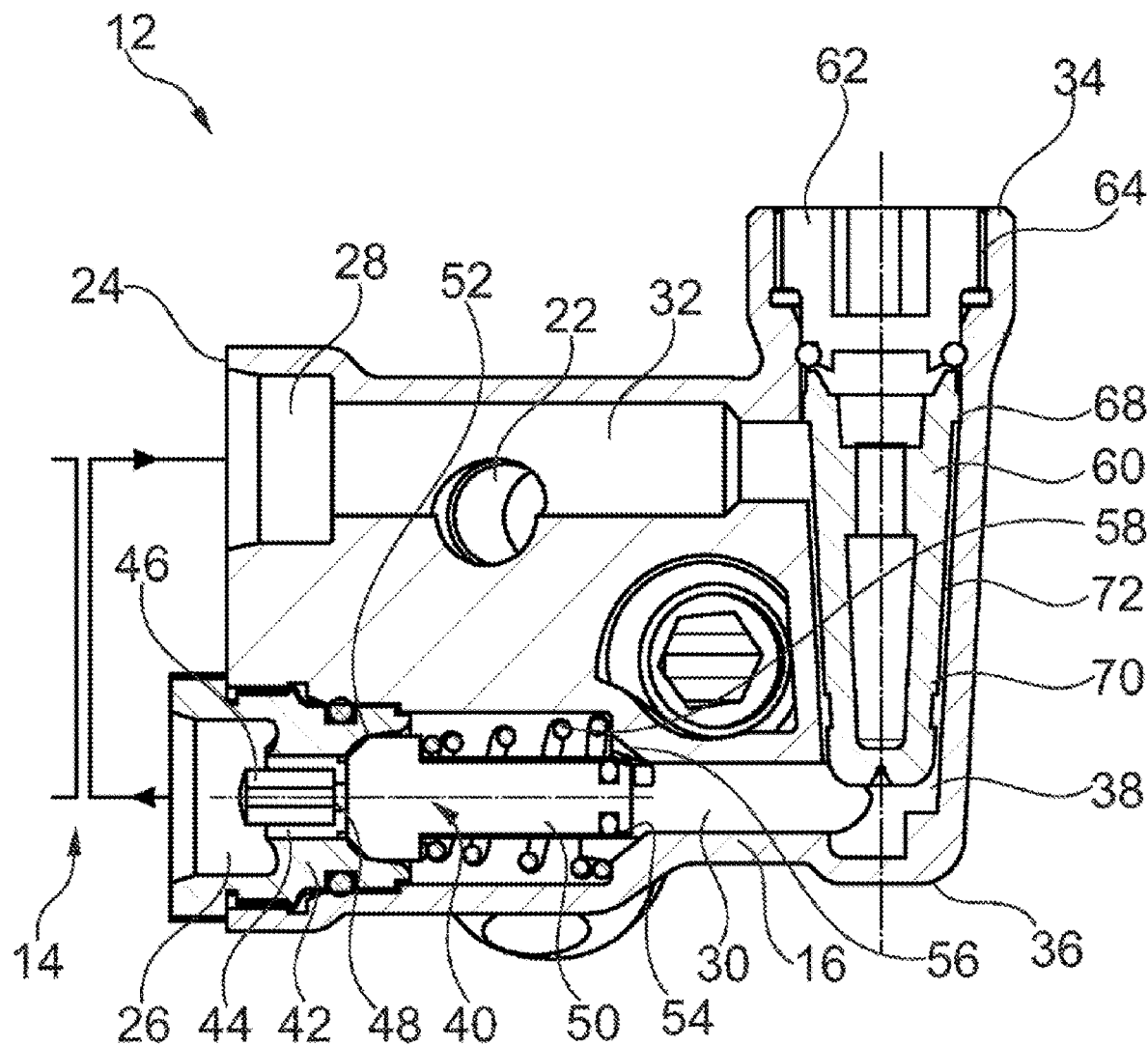
FIG. 6 shows a sectional view along the line II-II through the thermostat in FIG. 1 according to an embodiment of the disclose subject matter.

The embodiment in accordance with FIG. 5 corresponds as far as possible with that in accordance with FIG. 4, the pressure loss member 70 being configured here as a single-piece section of the housing 16 which constricts the bypass channel in sections and divides it into two sections (here, the channels 30, 32) which are connected to one another by way of a plurality of channels 76, the length of which corresponds to a multiple of their diameter.

The channels 76 can be produced by way of drilling or can already be produced during the injection molding of the housing 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermostat for a transmission oil circuit, comprising:
    a thermostat inlet;
    a thermostat outlet;
    a bypass channel which connects the thermostat inlet fluidically to the thermostat outlet;
    a circuit inlet which is connected fluidically to the thermostat inlet;
    a circuit outlet which is connected fluidically to the thermostat outlet;
    a control element to control flow through the bypass channel via a gap configured by a variable position of the control element; and
    a pressure loss member, the pressure loss member being arranged in the bypass channel such that an annular gap is formed, wherein in one position of the control element:
        the gap is larger than the annular gap such that pressure loss in the bypass channel is set by the annular gap and not the gap of the control element, and
        a throughflow cross section, configured by the annular gap of the pressure loss member, through the bypass channel is independent of the position of the control element.

2. The thermostat as claimed in claim 1, wherein the control element is configured so as to control a volumetric flow of oil through the circuit inlet and/or the circuit outlet in a manner dependent on oil temperature.

3. The thermostat as claimed in claim 1, wherein the control element has an expansion element.

4. The thermostat as claimed in claim 1, wherein the control element has a spring for prestressing a closure member in a switching direction.

5. The thermostat as claimed in claim 1, wherein the pressure loss member is configured separately from the control element and has a body which protrudes into the bypass channel and constricts the bypass channel in sections.

6. The thermostat as claimed in claim 1, wherein the annular gap is configured between the pressure loss member and a wall of the bypass channel, wherein the annular gap has a length in a flow direction which is at least half of an internal diameter of the annular gap.

7. The thermostat as claimed in claim 6, wherein the annular gap has a length in the flow direction of an entire internal diameter of the annular gap.

8. The thermostat as claimed in claim 5, wherein the pressure loss member is provided exchangeably in the thermostat.

9. The thermostat as claimed in claim 1, further comprising:
    a housing, wherein
        the thermostat inlet and the thermostat outlet are provided on a side of the housing,
        the circuit inlet and the circuit outlet are provided on an end side of the housing, and
        an assembly opening for exchanging the pressure loss member is provided on an upper or lower side of the housing.

10. The thermostat as claimed in claim 1, wherein two parallel channels are provided in an interior of a housing of the thermostat, the thermostat inlet opening laterally into one channel, and the thermostat outlet emanating laterally from the other channel, with a result that the two channels are divided in each case into two sections, of which in each case one is directly coupled to the bypass channel and one is directly coupled to the circuit inlet and/or circuit outlet.

11. The thermostat as claimed in claim 1, wherein the thermostat is configured for a transmission oil circuit of a vehicle transmission.

12. A transmission oil circuit, comprising:
    a transmission; and
    a thermostat as claimed in claim 1, wherein the transmission has a transmission oil outlet which merges directly into the thermostat inlet, and/or the transmission has a transmission oil inlet which merges directly into the thermostat outlet.

\* \* \* \* \*